(12) United States Patent
Oike et al.

(10) Patent No.: US 11,073,626 B2
(45) Date of Patent: Jul. 27, 2021

(54) SCINTILLATOR, METHOD OF FORMING THE SAME, AND RADIATION DETECTION APPARATUS

(71) Applicant: CANON KABUSHIKI KAISHA, Tokyo (JP)

(72) Inventors: Tomoyuki Oike, Yokohama (JP); Shoshiro Saruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/178,920

(22) Filed: Nov. 2, 2018

(65) Prior Publication Data
US 2019/0146101 A1 May 16, 2019

(30) Foreign Application Priority Data

Nov. 10, 2017 (JP) ............................. JP2017-217513
Sep. 6, 2018 (JP) ............................. JP2018-167216

(51) Int. Cl.
| | | |
|---|---|---|
| *G01T 1/20* | (2006.01) | |
| *G01T 1/202* | (2006.01) | |
| *C09K 11/61* | (2006.01) | |
| *C09K 11/58* | (2006.01) | |
| *G21K 4/00* | (2006.01) | |

(52) U.S. Cl.
CPC ............ *G01T 1/2023* (2013.01); *C09K 11/58* (2013.01); *C09K 11/616* (2013.01); *G01T 1/2018* (2013.01); *G21K 4/00* (2013.01)

(58) Field of Classification Search
CPC ....... G01T 1/20; G01T 1/2006; G01T 1/2008; G01T 1/2018; G01T 1/202
See application file for complete search history.

(56) References Cited

U.S. PATENT DOCUMENTS

| | | | |
|---|---|---|---|
| 9,315,919 B2 | 4/2016 | Shibutani et al. | |
| 2004/0159801 A1* | 8/2004 | Kishinami | C09K 11/628 250/484.4 |
| 2008/0099687 A1* | 5/2008 | Shoji | G01T 1/2018 250/368 |
| 2009/0283685 A1* | 11/2009 | Takeda | A61B 6/4233 250/370.11 |
| 2013/0308755 A1* | 11/2013 | Ishida | G01T 1/202 378/62 |

(Continued)

FOREIGN PATENT DOCUMENTS

JP 2016-088988 A 5/2016

OTHER PUBLICATIONS

Kazuo Sakai et al., "Determination of Electronic Properties of Deep Level Impurities in Semiconductor," 25(7) Seisan-Kenkyu 278-287 (Jul. 1973).

(Continued)

*Primary Examiner* — David P Porta
*Assistant Examiner* — Mamadou Faye
(74) *Attorney, Agent, or Firm* — Venable LLP

(57) ABSTRACT

A scintillator having a columnar crystal structure vapor-deposited on a substrate, wherein each column of the crystal structure contains an alkali halide metal compound as a host material, and further contains, as an additive, a compound of a precious metal as a metal having lower ionization tendency than hydrogen (H), with the additive having a lower melting point than the host material.

8 Claims, 4 Drawing Sheets

| | ACTIVATOR AGENT (Tl) CONCENTRATION [MOL%] | ADDITIVE (Cu) CONCENTRATION [ppm] | FILM THICKNESS [μm] | MTF EVALUATION VALUE (STANDARDIZED) | BRIGHT BURN EVALUATION VALUE (STANDARDIZED) | | |
|---|---|---|---|---|---|---|---|
| | | | | | AFTER 2.5 min | AFTER 10 min | AFTER 30 min |
| COMPARATIVE EXAMPLE | 0.42 | — | 750 | 100 | 100 | 95 | 91 |
| FIRST EXPERIMENTAL EXAMPLE | 0.45 | 3 | 720 | 112 | 60 | 51 | 38 |
| SECOND EXPERIMENTAL EXAMPLE | 0.75 | 10 | 585 | 127 | 46 | 39 | 36 |
| THIRD EXPERIMENTAL EXAMPLE | 0.43 | 30 | 655 | 111 | 34 | 32 | 30 |
| FOURTH EXPERIMENTAL EXAMPLE | 0.54 | 160 | 830 | 139 | 39 | 35 | 20 |
| FIFTH EXPERIMENTAL EXAMPLE | 0.55 | 180 | 720 | 146 | 40 | 35 | 11 |
| SIXTH EXPERIMENTAL EXAMPLE | 1.37 | 240 | 650 | 161 | 16 | 11 | 10 |

(56) References Cited

U.S. PATENT DOCUMENTS

| | | | |
|---|---|---|---|
| 2014/0008550 A1* | 1/2014 | Williams | C09K 11/616 250/483.1 |
| 2015/0021484 A1* | 1/2015 | Isa | G01T 1/20 250/361 R |
| 2015/0090886 A1* | 4/2015 | Ueyama | G01T 1/202 250/361 R |
| 2016/0280992 A1* | 9/2016 | Kawai | B32B 37/10 |

OTHER PUBLICATIONS

Tsugunori Okumura, "DLTS: Deep Level Transient Spectroscopy," 7(5) Hybrids 29-36 (1991).

* cited by examiner

F I G. 3

| | ACTIVATOR AGENT (Ti) CONCENTRATION [MOL%] | ADDITIVE (Cu) CONCENTRATION [ppm] | FILM THICKNESS [μm] | MTF EVALUATION VALUE (STANDARDIZED) | BRIGHT BURN EVALUATION VALUE (STANDARDIZED) | | |
|---|---|---|---|---|---|---|---|
| | | | | | AFTER 2.5 min | AFTER 10 min | AFTER 30 min |
| COMPARATIVE EXAMPLE | 0.42 | — | 750 | 100 | 100 | 95 | 91 |
| FIRST EXPERIMENTAL EXAMPLE | 0.45 | 3 | 720 | 112 | 60 | 51 | 38 |
| SECOND EXPERIMENTAL EXAMPLE | 0.75 | 10 | 585 | 127 | 46 | 39 | 36 |
| THIRD EXPERIMENTAL EXAMPLE | 0.43 | 30 | 655 | 111 | 34 | 32 | 30 |
| FOURTH EXPERIMENTAL EXAMPLE | 0.54 | 160 | 830 | 139 | 39 | 35 | 20 |
| FIFTH EXPERIMENTAL EXAMPLE | 0.55 | 180 | 720 | 146 | 40 | 35 | 11 |
| SIXTH EXPERIMENTAL EXAMPLE | 1.37 | 240 | 650 | 161 | 16 | 11 | 10 |

SCINTILLATOR, METHOD OF FORMING THE SAME, AND RADIATION DETECTION APPARATUS

BACKGROUND OF THE INVENTION

Field of the Invention

The present invention relates to a scintillator, a method of forming the same, and a radiation detection apparatus.

Description of the Related Art

Some radiation detection apparatuses (or radiation imaging apparatuses) are configured to convert radiation into light using a scintillator and detect the light using photoelectric conversion elements. A scintillator sometimes varies in characteristics in accordance with irradiation with radiation. Such a phenomenon is also called "bright burn" (see Japanese Patent Laid-Open No. 2016-88988).

Japanese Patent Laid-Open No. 2016-88988 discloses, as an example of a method of suppressing bright burn, a method of letting a scintillator include atoms as monovalent cations more than an activator agent for improving the luminous efficiency of the scintillator. However, such a composition will cause a deterioration in the crystallinity of the scintillator or a reduction in the transmission efficiency of light in the scintillator.

SUMMARY OF THE INVENTION

The present invention provides a technique advantageous in both suppressing bright burn and improving the quality of a scintillator.

One of the aspects of the present invention provides a scintillator having a columnar crystal structure vapor-deposited on a substrate, wherein each column of the crystal structure contains an alkali halide metal compound as a host material, and further contains, as an additive, a compound of a precious metal as a metal having lower ionization tendency than hydrogen (H), with the additive having a lower melting point than the host material.

Further features of the present invention will become apparent from the following description of exemplary embodiments with reference to the attached drawings.

BRIEF DESCRIPTION OF THE DRAWINGS

FIG. 3 is a view for comparing and explaining experimental results based on several conditions.

DESCRIPTION OF THE EMBODIMENTS

Figure 1A:
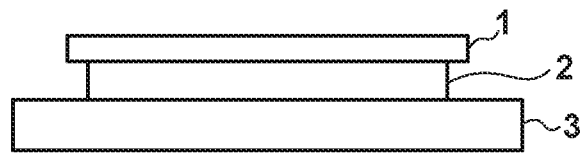
FIGS. 1A and 1B are views for explaining an example of a method of evaluating bright burn.

The preferred embodiments of the present invention will be described below with reference to the accompanying drawings. Note that the respective drawings are merely illustrated for the purpose of describing structures or configurations, and the dimensions of the illustrated respective members do not necessarily reflect actual dimensions. In addition, the same reference numerals denote the same elements in the respective drawings, and a repetitive description will be omitted.

Figure 1B:
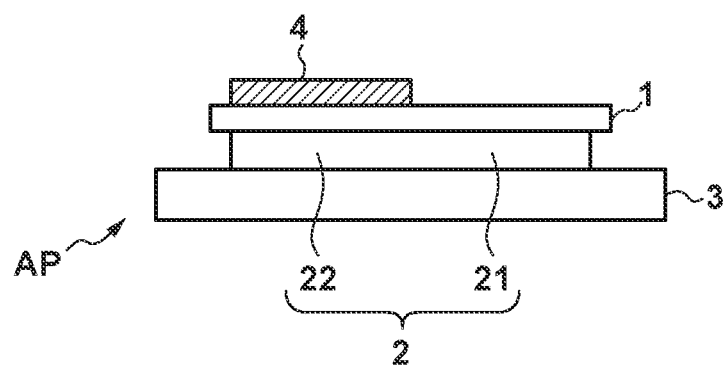

FIGS. 1A and 1B are schematic views for explaining a method of evaluating bright burn. As shown in FIG. 1A, bright burn is evaluated with respect to a radiation detection apparatus AP obtained by bonding a scintillator 2 vapor-deposited on a substrate 1 onto a sensor substrate (sensor unit) 3 on which a plurality of photoelectric conversion elements are arrayed. The scintillator 2 generates light (scintillation light) upon receiving radiation. The sensor substrate 3 detects this light. Assume that the radiation detection apparatus AP can detect radiation with this configuration.

The scintillator 2 is generally formed on the substrate 1 by a vapor deposition method under a nearly vacuum environment (for example, 0.01 Pa or less) using a vapor deposition apparatus, and has a columnar (needle-like) crystal structure in this case. Each column of the crystal structure includes an alkali halide metal compound as a host material. Assume that cesium iodide (CsI) is used as the host material in this case. In addition, in this case, each column of the scintillator 2 contains thallium (Tl) as an activator agent for improving luminous efficiency.

Note that the host material that can be used is not limited to the one exemplified in this case. For example, it is possible to use another type of fluorescent material such as sodium iodide (NaI) or potassium iodide (KI). In addition, the activator agent that can be used is not limited to the one exemplified in this case. For example, it is possible to use another type of activator agent such as europium (Eu) or indium (In).

FIG. 1B shows a state in which a radiation shielding member 4 is arranged on the radiation detection apparatus AP. Referring to FIG. 1B, a portion of the scintillator 2 which is not covered by the radiation shielding member 4 is defined as a "non-covered portion 21" and a portion of the scintillator 2 which is covered by the radiation shielding member 4 is defined as a "covered portion 22". When the radiation detection apparatus AP is irradiated with radiation in this state, the radiation enters the non-covered portion 21, and no radiation enters the covered portion 22. In this case, after the end of irradiation with radiation, a characteristic (sensitivity or conversion efficiency from radiation to light) difference sometimes occurs between the portions 21 and 22.

More specifically, carriers (electron-hole pairs) are generated at the non-covered portion 21 which radiation has entered, and recombine to generate scintillation light. At this time, at the non-covered portion 21, such carriers are sometimes unintentionally trapped at an energy trap level (to be simply referred to as a trap level hereinafter) originating from lattice defects or the like. This can cause recombination at an unexpected timing after the end of irradiation with radiation or unexpected characteristic variation at the time of further irradiation with radiation. Such a phenomenon is called bright burn.

More specifically, a trap level is an energy level that can be formed in a band gap (valence band—conduction band energy band) in the crystal structure of the scintillator 2. This is an energy level at which carriers can be trapped. For example, a trap level can be formed by, for example, a lattice defect (so-called iodine leakage) caused by the leakage of one or more iodine atoms mainly in the crystal structure of the scintillator 2 made of cesium iodide. In addition, a trap level can be formed because of the presence of thallium as an activator agent. In general, a trap level caused by the presence of thallium is an energy level "deeper (at a position near the middle of the band gap) than a trap level originating from a lattice defect. When, therefore, a lattice defect is present near thallium, carriers are trapped at a trap level for a relatively long period of time. This causes the above bright burn. Bright burn sometimes remains for, for example, several hours to several days after irradiation with radiation.

The following literatures can give additional explanations to the above description:

Kazuo Sakai et al., "Determination of Electronic Properties of Deep Level Impurities in Semiconductor", Seisan-Kenkyu, Volume 25, Issue 7, pp. 278-287, July 1973

Tsugunori Okumura, "DLTS: Deep Level Transient Spectroscopy", HYBRIDS, Vol, 7, No. 5, pp. 29-36, 1991

As described above, bright burn can occur after the end of irradiation with radiation, and a characteristic difference can occur between the portions 21 and 22. Bright burn is evaluated by measuring the luminance of the scintillator 2 when it is irradiated with radiation having relatively low radiation intensity (dose) after so-called "burning" is performed by irradiating the scintillator 2 with radiation having relatively high radiation intensity. In this specification, an evaluation value BB(t) of bright burn is expressed as:

$$BB(t)=\{a(t)/b(t)\}/\{a(0)/b(0)\}-1$$

where a(0): the luminance value (per unit volume; the same hereinafter) of the non-covered portion 21 before burning b(0): the luminance value of the covered portion 22 before burning a(t): the luminance value of the non-covered portion 21 after the lapse of a time t since burning b(t): the luminance value of the covered portion 22 after the lapse of a time t since burning According to the above mathematic expression, a(0)/b(0) represents the luminance value ratio between the non-covered portion 21 and the covered portion 22 before burning. Assume that in this case, the luminance distribution of the scintillator 2 is uniform between the non-covered portion 21 and the covered portion 22.

$$a(0)/b(0)=1$$

Subsequently, as shown in FIG. 1B, the radiation shielding member 4 was placed on the substrate 1, and burning was performed. Thereafter, the radiation shielding member 4 was removed, and the luminance values of the non-covered portion 21 and the covered portion 22 after the lapse of the time t were measured to obtain a(t)/b(t).

In this case, when the above bright burn has occurred, $$a(t)/b(t)>1$$

and $$BB(t)>0$$

In contrast to this, when bright burn has been suppressed or reduced, $$BB(t)\approx 0$$

That is, as the evaluation value BB(t) decreases, bright burn is suppressed or reduced more, and hence the quality of the scintillator 2 is high.

When the bright burn evaluation value BB(t) increases, a signal obtained by a given shooting operation may be superimposed on a signal obtained by the immediately preceding shooting operation. This may cause afterimage and artifacts in images obtained by shooting, and hence may cause a deterioration in the quality of images. Such a problem can occur when, for example, radiography is continuously performed (so-called continuous radiography is performed).

In this case, when the change amount of luminance value between the non-covered portion 21 and the covered portion 22 after burning is sufficiently smaller (for example, 1/10 or less) than noise (noise component, so-called dark noise, originating from a dark current) in the photoelectric conversion elements on the sensor substrate 3, the change amount of luminance value is buried in noise and becomes difficult to discriminate. For this reason, when the S/N ratio of the photoelectric conversion elements on the sensor substrate 3 in general use is set to 30 dB ($20\times\log_{10}(S/N)=30$, that is, S/N≈33), the target value of the evaluation value BB(t) is preferably set to 0.3% or less.

Figure 2:
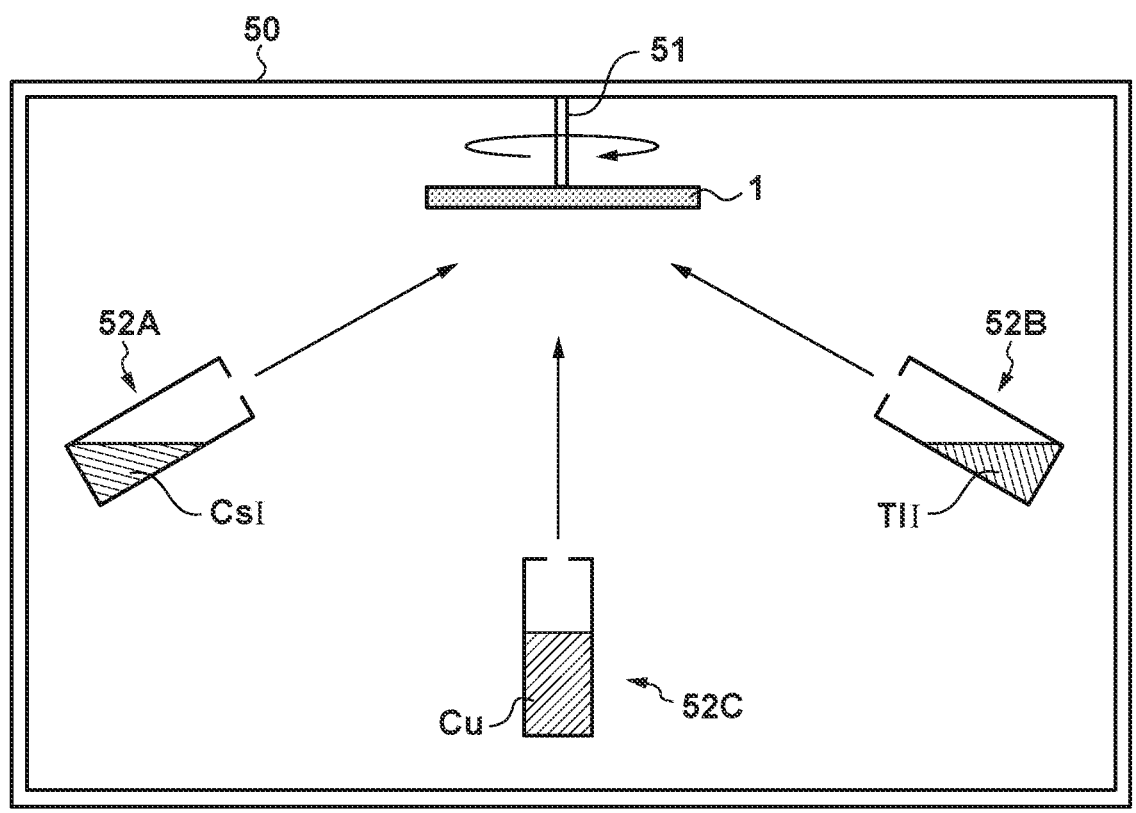
FIG. 2 is a view for explaining an example of a method of forming a scintillator.

FIG. 2 is a schematic view for explaining a method of forming the scintillator 2 according to this embodiment. Although described in detail later, according to this embodiment, in order to suppress or reduce the bright burn described above, the scintillator 2 further includes an additive having a lower melting point than the host material (to be sometimes simply referred to as an "additive" hereinafter in the specification).

As this additive, a compound of a precious metal as a metal having lower ionization tendency than hydrogen (H) is used. Such precious metals include gold (Au), silver (Ag), platinum (Pt), palladium (Pd), rhodium (Rh), iridium (Ir), ruthenium (Ru), osmium (Os), copper (Cu), and mercury (Hg). At least one of them is used. When a precious metal is copper or silver, a corresponding compound is, for example, an iodide such as copper iodide or silver iodide or a bromide such as copper bromide or silver bromide.

The scintillator 2 can be formed by using a known vapor deposition apparatus 5. Vapor deposition processing by the vapor deposition apparatus 5 is performed by using electron beam vapor deposition as a suitable method. In this embodiment, the vapor deposition apparatus 5 includes a chamber 50, a holding unit 51, and evaporation units 52A, 52B, and 52C. The chamber 50 provides a space for performing vapor deposition. A controller (not shown) can control the pressure and temperature inside the chamber 50. When performing vapor deposition, the controller maintains the inside of the chamber 50 in a nearly vacuum state (0.01 Pa or less) and at a desired temperature (for example, about 80° C. to 140° C.). The holding unit 51 rotatably holds the substrate 1 as a vapor deposition processing target as indicated by the arrow in FIG. 2, and rotates the substrate 1 in vapor deposition processing.

The evaporation unit 52A reserves cesium iodide as a source material (evaporation source material) in a crucible, heats the material up to a temperature equal to or higher than its melting point in vapor deposition processing, and emits the vaporized material toward the substrate 1 held by the holding unit 51. The evaporation unit 52B reserves thallium iodide as a source material in a crucible, heats the material up to a temperature equal to or higher than its melting point in vapor deposition processing, and emits the vaporized material toward the substrate 1. The evaporation unit 52C reserves copper as a source material in a crucible, heats the material up to a temperature equal to or higher than its melting point in vapor deposition processing, and emits the vaporized material toward the substrate 1. The evaporation units 52A to 52C emit vaporized materials in parallel. Although described in detail later, this operation will form the scintillator 2 including an activator agent and additives on the substrate 1 so as to have a columnar crystal structure.

The present inventors have found from extensive studies that bright burn is suppressed or reduced by letting the scintillator 2 contain the above additives. The mechanism of this effect is considered as follows. That is, according to this embodiment, the additives contained in the scintillator 2 are coupled to the trap level or cancel the effect of the trap level. Alternatively, the additives provide carriers (free electrons) that can be trapped at the trap level so as to let the trap level capture the carriers in advance. This allows carriers (electron-hole pairs), generated at the time of subsequent irradiation with radiation, to properly recombine to generate scintillation light without being trapped at the trap level. As a result, the bright burn described above is suppressed or reduced.

The additives contained in the scintillator 2 can be checked by, for example, X-ray diffraction. Because the scintillator 2 has deliquescence, for example, the scintillator 2 is dissolved in water and then vaporized and dried to obtain the powder of the scintillator 2. In this embodiment, copper is used as the above precious metal. When X-ray diffraction is performed for this powder, copper as a pure metal is not detected, while CuI (melting point of 605° C.), $Cs_3Cu_2I_5$ (melting point of 390° C.), and $CsCu_2I_3$ (melting point of 383° C.) are detected.

That is, the above additives are copper compounds (CuI, $Cs_3Cu_2I_5$, and $CsCu_2I_3$), each of which has a lower melting point than cesium iodide as the host material (melting point of 621° C.). In this embodiment, the above additives do not have higher melting point than the host material, and hence are not contained at least as granular or powdery impurities as a result of vapor deposition processing by the vapor deposition apparatus 5. In other words, elements (atoms) constituting additives are considered to be incorporated as constituent atoms of the columnar crystal structure of the scintillator 2 in the crystal structure. Accordingly, these additives are not deposited as solids. This improves the crystallinity of the scintillator 2. Accordingly, the light transmission characteristic of the scintillator improves, that is, the quality of the scintillator 2 improves.

Experimental results based on several conditions will be described below with reference to FIG. 3. FIG. 3 shows a comparative example and first to sixth experimental examples.

The comparative example corresponds to a comparative example containing no precious metal additives. As the comparative example, the scintillator 2 was formed, which has a columnar crystal structure containing cesium iodide as a host material and thallium as an activator agent. More specifically, the evaporation units 52A and 52B respectively reserve cesium iodide and thallium iodide, vaporize them, and emit them to the substrate 1. As the substrate 1, a substrate was prepared, which was obtained by forming an aluminum film (Al with a thickness of 200 nm) as a reflecting layer on a silicon substrate with a predetermined thickness and stacking a silicon oxide film ($SiO_2$ with a thickness of 100 nm) on the aluminum film. Vapor deposition processing was performed under the conditions that the pressure inside the chamber 50 was 0.01 Pa or less, the temperature of the substrate 1 was about 80° C. to 140° C., and the rotational speed of the substrate 1 by the holding unit 51 was 60 rpm. Assume that the evaporation unit 52C is not installed/driven in the comparative example.

After the vapor deposition processing, when the temperature of the substrate 1 having undergone processing decreased to room temperature, SEM (scanning electron microscope) observation and ICP (inductively coupled plasma) analysis were performed with respect to the scintillator 2 formed on the substrate 1. In the comparative example, a columnar crystal structure with a film thickness of about 750 μm and a thallium concentration of about 0.42 mol % was obtained as the scintillator 2.

MTF (Modulation Transfer Function) evaluation at spatial frequency 2 LP/mm (line pairs/mm) based on the edge method was performed with respect the scintillator 2 described above by using radiation quality RQAS complying with the international standards. For comparison with the second experimental example to be described later, the MTF evaluation value of the comparative example was set to "100" in FIG. 3.

In addition, the bright burn evaluation described above with reference to FIG. 1B was performed with respect to the scintillator 2 described above. First of all, in the state shown in FIG. 1B (the radiation shielding member 4 is arranged), the scintillator 2 was irradiated (burnt) with radiation under radiation irradiation conditions including a tube voltage of about 80 kV and a dose of about 2.9 mGy. Subsequently, the radiation shielding member 4 was removed, and the scintillator 2 was irradiated with radiation through a copper plate with a thickness of 0.6 mm under the conditions that a tube voltage was about 70 kV and a dose was about 2 μGy, after the lapse of 2.5 minutes, 10 minutes, and 30 minutes. With this operation, the bright burn evaluation value BB (2.5 min), the bright burn evaluation value BB (10 min), and the bright burn evaluation value BB (30 min) were obtained.

For the sake of comparison, the bright burn evaluation value after the lapse of 2.5 min was set to "100" in FIG. 3. In this case, the bright burn evaluation value after the lapse of 10 min (that is, BB(10 min)/BB(2.5 min)×100) was 95. In addition, the bright burn evaluation value after the lapse of 30 min (that is, BB(30 min)/BB(2.5 min)×100) was 91.

The first experimental example corresponds to an experimental example of this embodiment including additives. In the first experimental example, the evaporation unit 52C is driven, together with the evaporation units 52A and 52B. The evaporation unit 52C reserves copper, vaporizes the copper, and emits it toward the substrate 1. Other conditions are the same as those in the comparative example. With this operation, the scintillator 2 further containing a copper compound as an additive was formed. As a result of SEM observation and ICP analysis, in the first experimental example, a columnar crystal structure having a film thickness of about 720 μm, a thallium concentration of about 0.45 mol %, and an additive concentration of 3 ppm was obtained as the scintillator 2.

In the first experimental example, MTF evaluation and bright burn evaluation were performed according to the same procedure as in the comparative example. In the first experimental example, the MTF evaluation value was 112. In addition, in the first experimental example, the bright burn evaluation values after the lapse of 2.5 min, 10 min, and 30 min were 60, 51, and 38, respectively. That is, bright burn was suppressed or reduced to about 60% as compared with the comparative example.

The second experimental example corresponds to an experimental example of this embodiment containing more additives than the first experimental example. As a result of SEM observation and ICP analysis, in the second experimental example, a columnar crystal structure having a film thickness of about 585 μm, a thallium concentration of about 0.75 mol %, and an additive concentration of 10 ppm was obtained as the scintillator 2.

In the second experimental example as well, MTF evaluation and bright burn evaluation were performed according to the same procedure as in the comparative example. In the second experimental example, the MTF evaluation value was 127. In addition, in the second experimental example, the bright burn evaluation values after the lapse of 2.5 min, 10 min, and 30 min were 46, 39, and 36, respectively. That is, bright burn was suppressed or reduced.

The third experimental example corresponds to an experimental example of this embodiment containing more additives than the second experimental example. As a result of SEM observation and ICP analysis, in the third experimental example, a columnar crystal structure having a film thickness of about 655 μm, a thallium concentration of about 0.43 mol %, and an additive concentration of 30 ppm was obtained as the scintillator 2.

In the third experimental example as well, MTF evaluation and bright burn evaluation were performed according to the same procedure as in the comparative example. In the third experimental example, the MTF evaluation value was 111. In addition, in the third experimental example, the bright burn evaluation values after the lapse of 2.5 min, 10 min, and 30 min were 34, 32, and 30, respectively. That is, bright burn was suppressed or reduced.

The fourth experimental example corresponds to an experimental example of this embodiment containing more additives than the third experimental example. As a result of SEM observation and ICP analysis, in the fourth experimental example, a columnar crystal structure having a film thickness of about 830 μm, a thallium concentration of about 0.54 mol %, and an additive concentration of 160 ppm was obtained as the scintillator 2.

In the fourth experimental example as well, MTF evaluation and bright burn evaluation were performed according to the same procedure as in the comparative example. In the fourth experimental example, the MTF evaluation value was 139. In addition, in the fourth experimental example, the bright burn evaluation values after the lapse of 2.5 min, 10 min, and 30 min were 39, 35, and 20, respectively. That is, bright burn was suppressed or reduced.

The fifth experimental example corresponds to an experimental example of this embodiment containing more additives than the fourth experimental example. As a result of SEM observation and ICP analysis, in the fifth experimental example, a columnar crystal structure having a film thickness of about 720 μm, a thallium concentration of about 0.55 mol %, and an additive concentration of 180 ppm was obtained as the scintillator 2.

In the fifth experimental example as well, MTF evaluation and bright burn evaluation were performed according to the same procedure as in the comparative example. In the fifth experimental example, the MTF evaluation value was 146. In addition, in the fifth experimental example, the bright burn evaluation values after the lapse of 2.5 min, 10 min, and 30 min were 40, 35, and 11, respectively. That is, bright burn was suppressed or reduced.

The sixth experimental example corresponds to an experimental example of this embodiment containing more additives than the fifth experimental example. As a result of SEM observation and ICP analysis, in the sixth experimental example, a columnar crystal structure having a film thickness of about 650 μm, a thallium concentration of about 1.37 mol %, and an additive concentration of 240 ppm was obtained as the scintillator 2.

In the sixth experimental example as well, MTF evaluation and bright burn evaluation were performed according to the same procedure as in the comparative example. In the sixth experimental example, the MTF evaluation value was 161. In addition, in the sixth experimental example, the bright burn evaluation values after the lapse of 2.5 min, 10 min, and 30 min were 16, 11, and 10, respectively. That is, bright burn was suppressed or reduced.

As described above, according to this embodiment, each column of the scintillator 2 with the columnar crystal structure contains an alkali halide metal compound as a host material, and also contains a compound of a precious metal as an additive having a lower melting point than the host material. This prevents carriers (electron-hole pairs), generated at the time of irradiation with radiation, from being unintentionally trapped at a trap level originating from, for example, a lattice defect in the scintillator 2. Accordingly, this embodiment can suppress or reduce bright burn. This is especially advantageous for a crystal structure that contains an activator agent (thallium in the embodiment) as another additive and can have a "deep" trap level. In addition, it is considered that using a material having a lower melting point than a host material as the above additive allows the element of the additive to be incorporated as a constituent atom of the columnar crystal structure into the crystal structure of the scintillator 2 at the time of vapor deposition. In this case, the additive is not deposited. Therefore, the embodiment can improve the crystallinity of the scintillator 2 and hence is advantageous in improving the quality of the scintillator 2.

In this case, increasing the additive concentration may reduce the luminance when the scintillator 2 receives radiation. Referring to FIG. 3, as is obvious from the experimental results of the first to sixth experimental examples, the first experimental example indicates that setting the additive concentration to 3 ppm will suppress or reduce bright burn. Accordingly, there is no need to let the scintillator 2 excessively contain an additive. For example, setting the additive concentration to 240 ppm or less, preferably 160 ppm or less, and more preferably 30 ppm or less can suppress or reduce bright burn while maintaining the luminance of the scintillator 2. On the other hand, in order to properly suppress or reduce bright burn, for example, the additive concentration is preferably set to 3 ppm or more, and preferably 10 ppm or more.

In summary, letting the scintillator 2 contain a compound of a precious metal as an additive can improve both the crystallinity and quality of the scintillator 2. On the other hand, excessively increasing the additive concentration sometimes reduces the luminance (the luminance of scintillation light) of the scintillator 2. Accordingly, the scintillator 2 may contain the above additive at a concentration at which the luminance of scintillation light is maintained. For example, the additive concentration may be decided such that a decrease in the luminance of the scintillator 2 including the additive becomes 20% or less, and preferably 10% or less, of a decrease in the luminance of the scintillator that does not contain the additive.

The above scintillator can be applied to a radiation detection apparatus (radiation imaging apparatus) that detects radiation. As radiation, X-rays are typically used. However, α-rays, β-rays, or the like may be used.

Figure 4:
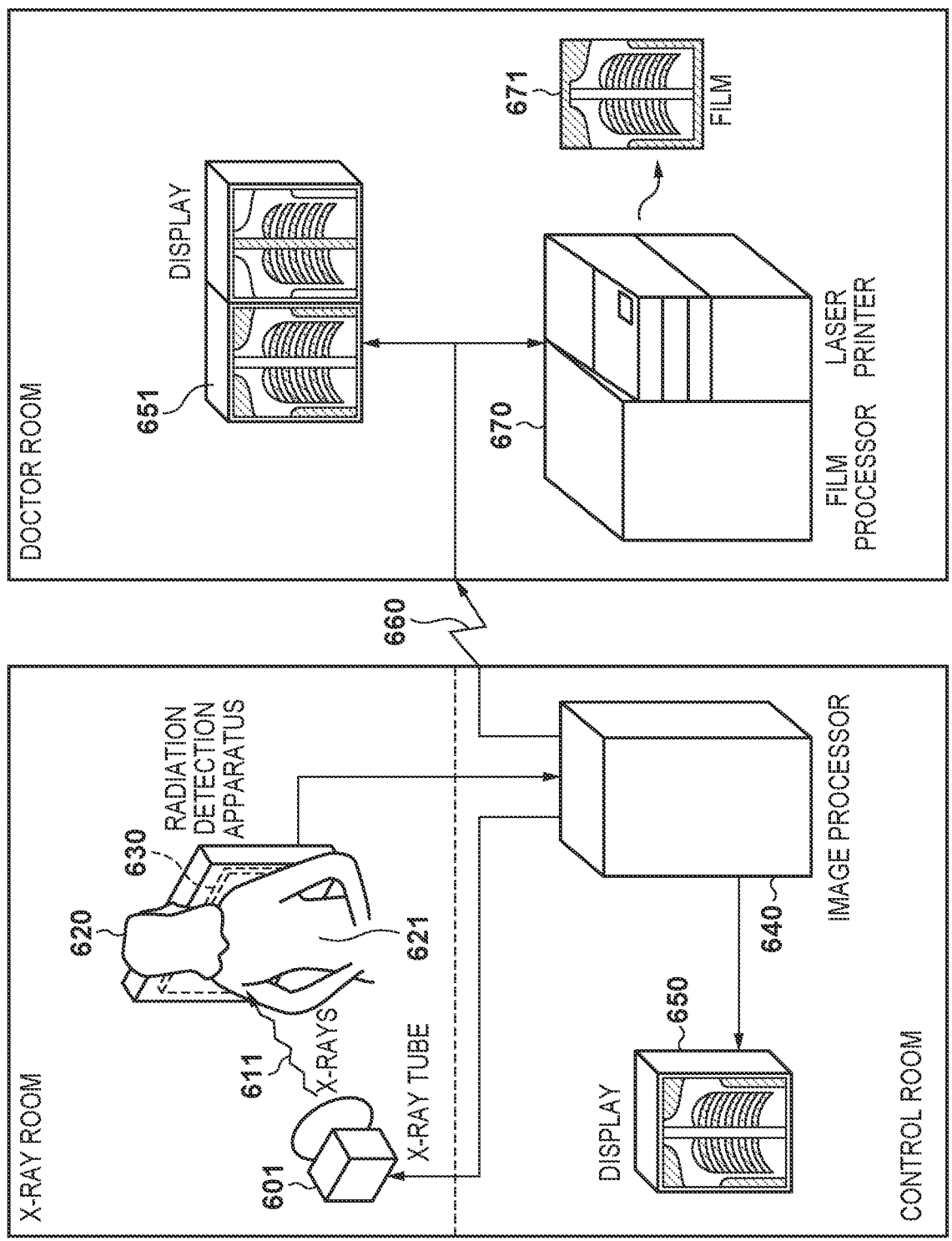
FIG. 4 is a view for explaining an example of the usage of a radiation detection apparatus.

FIG. 4 shows an example of the usage of the radiation detection apparatus. Radiation 611 generated by a radiation source 610 is transmitted through a chest 621 of an object 620 such as a patient and enters a radiation detection apparatus 630. The radiation 611 that has entered the apparatus 630 contains internal information of the patient 620. The apparatus 630 acquires electrical information corresponding to the radiation 611. This information is converted into a digital signal. For example, a processor 640 then performs predetermined signal processing for the digital signal.

A user such as a doctor can observe a radiation image corresponding to this electrical information on a display 650 in, for example, a control room. The user can transfer the radiation image or the corresponding data to a remote place via a predetermined communication means 660. The user can also observe this radiation image on a display 651 in a doctor room as another place. The user can also record the radiation image or the corresponding data on a predetermined recording medium. For example, a processor 670 can also record the radiation image or the corresponding data on a film 671.

Although several preferred examples have been described above, the present invention is not limited to them, and the examples may be partly changed without departing from the spirit of the present invention. In addition, it is obvious that each term in this specification is merely used to explain the present invention, and the present invention is not limited to the strict meaning of the term. The present invention can include equivalents of the terms.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-217513, filed on Nov. 10, 2017 and No. 2018-167216, filed on Sep. 6, 2018, which are hereby incorporated by reference herein in their entirety.

What is claimed is:

1. A scintillator having a columnar crystal structure vapor-deposited on a substrate,
    wherein each column of the crystal structure contains:
    an alkali halide metal compound as a host material;
    an activator agent for forming a trap level in a band gap of the crystal structure so as to improve luminous efficiency of the host material, wherein the activator agent is at least one element selected from the group consisting of thallium (Tl), europium (Eu), and indium (In); and
    a compound of a precious metal, which is a metal having a lower ionization tendency than hydrogen (H), as an additive that is different from the activator agent and that has a lower melting point than the host material, wherein the precious metal is at least one element selected from the group consisting of gold (Au), silver (Ag), platinum (Pt), palladium (Pd), rhodium (Rh), iridium (Ir), ruthenium (Ru), osmium (Os), copper (Cu), and mercury (Hg).

2. The scintillator according to claim 1, wherein the additive is not contained as a granular or powdery impurity in the crystal structure.

3. The scintillator according to claim 1, wherein the host material is at least one selected from the group consisting of cesium iodide (CsI), sodium iodide (NaI), and potassium iodide (KI).

4. The scintillator according to claim 1, wherein the host material is cesium iodide (CsI), the activator agent is thallium (Tl), and the precious metal is at least one element selected from the group consisting of gold (Au), silver (Ag), and copper (Cu).

5. The scintillator according to claim 1, wherein the host material is cesium iodide (CsI), the activator agent is thallium (Tl), and the additive is a copper compound at a content of 10 ppm to 30 ppm, and
    wherein when X-ray diffraction is performed for a powder of the scintillator obtained by dissolving the scintillator in water and then vaporizing and drying, at least one selected from the group consisting of CuI, $Cs_3Cu_2I_5$, and $CsCu_2I_3$ is detected as the copper compound.

6. A radiation detection apparatus comprising:
    a scintillator defined in claim 1; and
    a sensor unit in which a plurality of photoelectric conversion elements are arrayed.

7. A scintillator having a columnar crystal structure vapor-deposited on a substrate,
    wherein each column of the crystal structure contains:
    an alkali halide metal compound as a host material;
    an activator agent for forming a trap level in a band gap of the crystal structure so as to improve luminous efficiency of the host material, wherein the activator agent is at least one element selected from the group consisting of thallium (Tl), europium (Eu), and indium (In); and
    a compound of a precious metal, which is a metal having a lower ionization tendency than hydrogen (H), as an additive that is different from the activator agent and that has a lower melting point than the host material, at a concentration at which luminance of scintillation light is maintained, wherein the precious metal is at least one element selected from the group consisting of gold (Au), silver (Ag), platinum (Pt), palladium (Pd), rhodium (Rh), iridium (Ir), ruthenium (Ru), osmium (Os), copper (Cu), and mercury (Hg).

8. A method of forming a scintillator, the method comprising:
    preparing a substrate; and
    forming a scintillator having a columnar crystal structure by vapor-depositing an alkali halide metal compound, an activator agent, and a precious metal, which is a metal having a lower ionization tendency than hydrogen (H), on the substrate,
    wherein each column of the crystal structure contains:
    the alkali halide metal compound as a host material;
    the activator agent for forming a trap level in a band gap of the crystal structure so as to improve luminous efficiency of the host material, wherein the activator agent is at least one element selected from the group consisting of thallium (Tl), europium (Eu), and indium (In); and
    a compound of the precious metal as an additive having a lower melting point than the host material, where the additive is different from the activator agent, wherein the precious metal is at least one element selected from the group consisting of gold (Au), silver (Ag), platinum (Pt), palladium (Pd), rhodium (Rh), iridium (Ir), ruthenium (Ru), osmium (Os), copper (Cu), and mercury (Hg).

* * * * *